United States Patent [19]
Licitis et al.

[11] 3,791,656

[45] Feb. 12, 1974

[54] PHONOGRAPH INDEX MEANS

[75] Inventors: Gunars Licitis, Lombard, Ill.; Gerald M. Rodmaker, Cincinnati, Ohio

[73] Assignee: Marvin Glass & Associates, Chicago, Ill.

[22] Filed: Sept. 21, 1972

[21] Appl. No.: 290,971

[52] U.S. Cl. .................................................. 274/17
[51] Int. Cl. .............................................. G11b 17/06
[58] Field of Search ........... 274/17, 14, 20, 21, 1 A

[56] References Cited

UNITED STATES PATENTS

| | | | |
|---|---|---|---|
| 3,697,086 | 10/1972 | Licitis | 274/17 |
| 432,462 | 7/1890 | White | 274/17 |
| 3,086,297 | 4/1963 | Kay | 274/14 X |
| 2,459,038 | 1/1949 | McKnight | 274/17 |
| 3,610,638 | 10/1971 | Castagna | 274/14 |

*Primary Examiner*—Harry N. Haroian
*Attorney, Agent, or Firm*—Coffee & Sweeney

[57] ABSTRACT

Apparatus for indexing a stylus relative to any of a plurality of recording bands on a record. The apparatus includes an elongated tone arm mounting a stylus and which is received in a bridge on an indexing arm movably mounted for indexing relative to a record. The tone arm is connected to the indexing arm by means of a connection which permits pivotal movement of the tone arm relative to the indexing arm. The indexing arm itself is pivotally movable about an axis perpendicular to the tone arm pivot axis for moving the stylus away from the record. The tone arm is thus moved away from the record and to a predetermined position on the indexing arm which then may be moved to a desired band on the record.

14 Claims, 7 Drawing Figures

PHONOGRAPH INDEX MEANS

BACKGROUND OF THE INVENTION

This invention relates to sound reproduction apparatus and more particularly, to means for indexing a stylus relative to a record, generally of the type shown in copending application Ser. No. 113,299 which was filed on Feb. 8, 1971 and entitled "Phonograph Index Means," and now U.S. Pat. No. 3,697,086, assigned to the assignee of the present invention.

Over the years, there have been a number of proposals for sound reproduction systems employing records. However, notwithstanding the large number of such proposals, there is currently unavailable a sound reproducing apparatus that can be economically manufactured for use in, for example, toys, and which has good sound reproduction characteristics.

SUMMARY OF THE INVENTION

The principal object of the invention is to provide a new and improved sound reproducing device, and more particularly, means for indexing a stylus relative to a record having a plurality of recording bands.

The foregoing object is realized through a construction including a tone arm mounting a stylus, which tone arm is received on a bridge mounted on an indexing arm movably mounted at one end. The tone arm is further connected to the indexing arm by means of a pivotal construction which permits the tone arm to pivot with the indexing arm out of contact with a record and pivot relative to the indexing arm to move longitudinally of the record. The tone arm will normally be in engagement with the record and a manual operator is connected to the indexing arm at an end thereof. The manual operator includes a detent portion for holding the indexing arm at a desired position of movement relative to a record corresponding to the approximate start of a particular band thereon. The manual operator also includes a tone arm engaging element which engages the tone arm intermediate the pivot and the point whereat the same passes through the bridge when indexing is desired to pivot the tone arm about the pivot to a position whereby the stylus will enter the exact beginning of a recording band on the record when the handle is released.

Other objects, features and advantages of the invention will become apparent from the following specification taken in conjunction with the accompanying drawings.

DESCRIPTION OF THE PREFERRED EMBODIMENT

Figures 1, 2, 7:
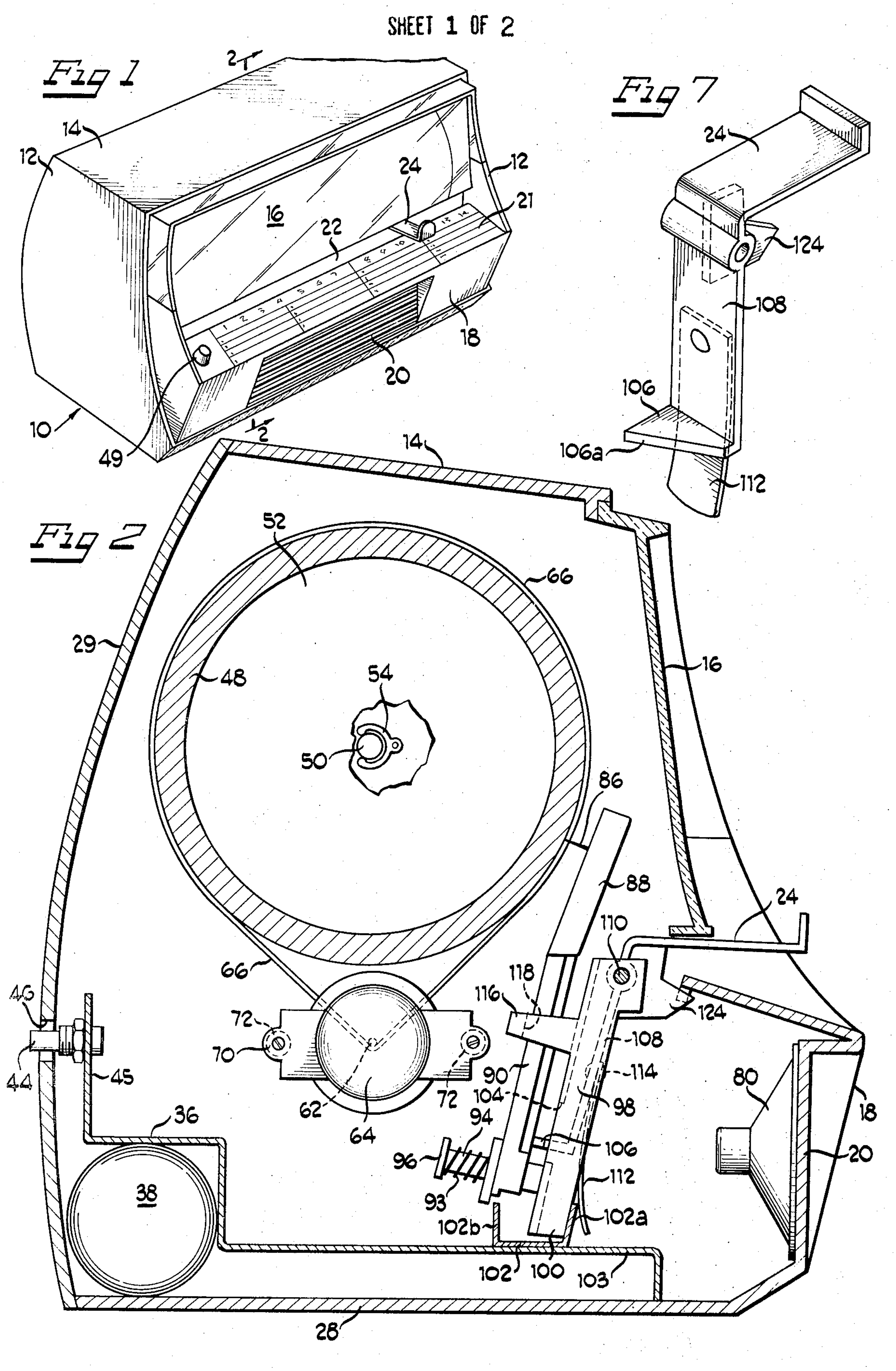
FIG. 1 is a perspective view of a preferred embodiment of the invention.
FIG. 2 is a vertical section taken generally along the line 2—2 of FIG. 1.
FIG. 7 is a perspective view of the manual operator element.

An exemplary embodiment of the invention is illustrated in FIG. 1 and is seen to comprise a housing, generally designated 10, configured in the form of a juke box. The housing 10 is formed by a pair of end panels 12 which are interconnected at their tops by top wall 14 which is positioned above a transparent front cover 16. The housing 10 further includes a lower front panel 18 having a grate 20 behind which a sound reproduction device may be located. Indicia means 21 may be placed on a top portion of the front panel 18 to list the tunes or songs in sequence on the interior phonograph record.

Figures 3, 4, 5, 6:
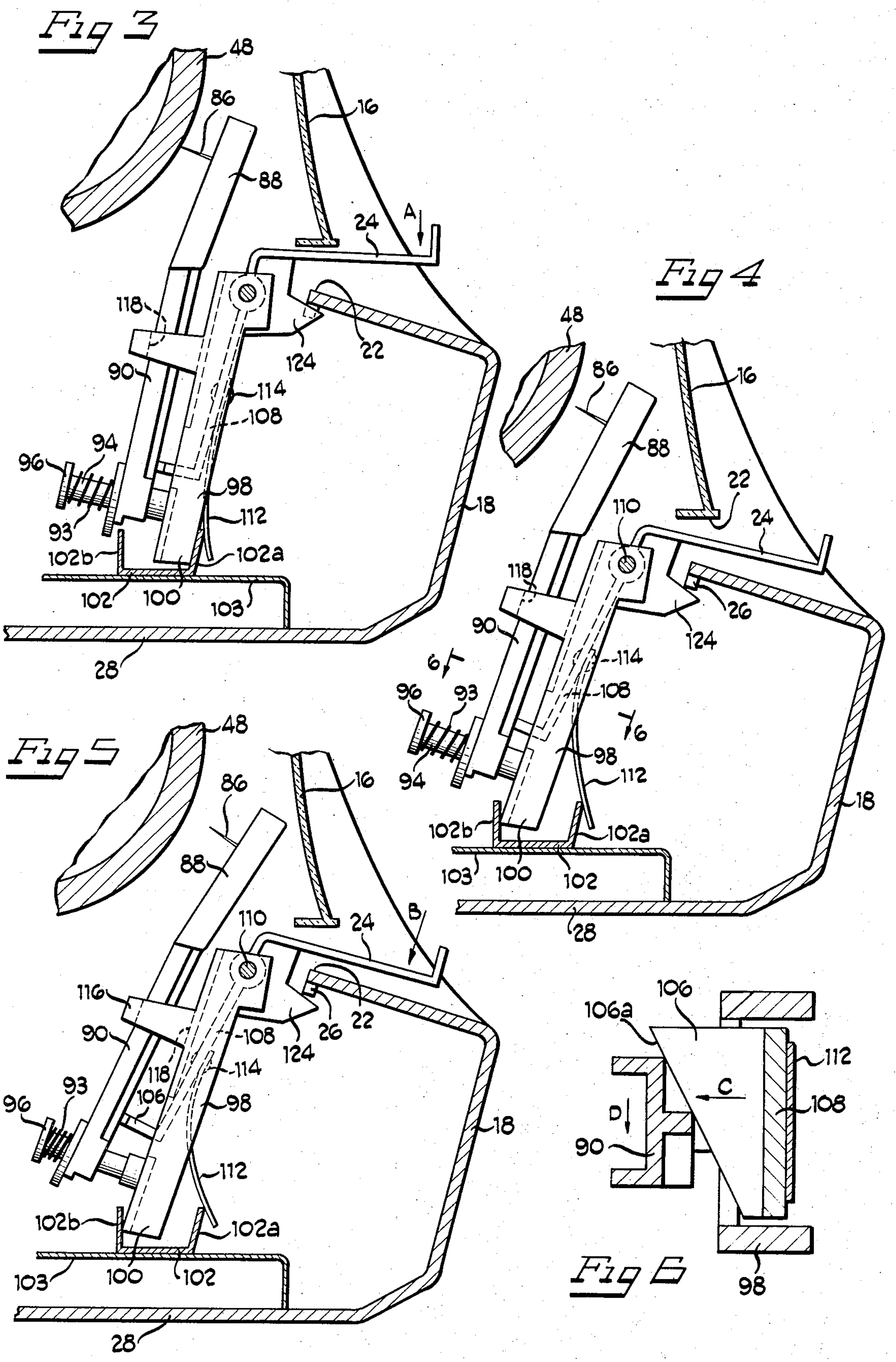
FIG. 3 is a fragmentary vertical section illustrating the position of various elements of the indexing mechanism with the stylus in contact with the record.
FIG. 4 is a view similar to that of FIG. 3 with the various elements in position during an indexing operation.
FIG. 5 is a view similar to that of FIG. 4 with the tone arm and stylus biased further away from the record.
FIG. 6 is a horizontal section taken generally along the line 6—6 of FIG. 4.

The front cover 16 and the lower front panel 18 terminate short of each other to define a slot 22 in which a handle 24 on a manual operator for indexing an audio pickup may be moved. Various slots, generally designated 26 in FIGS. 4 and 5, are provided on the underside of the back edge of the panel 18 to serve as portions of detents for the manual operation when a particular band on a record has been selected for playback.

Turning now to FIG. 2, the housing 10 further includes a bottom wall 28 and a back panel 29. The back panel is removably mounted by appropriate screws or the like to provide access to the interior of the housing where a battery housing 36 is provided for receiving batteries 38. The batteries may be placed in or removed from the battery housing 36 by removing the back panel.

A speed control 44 is mounted on an upstanding flange 45 of the battery housing and protrudes through an aperture 46 in the back panel. By removing the back panel, a record 48 may be placed into the housing 10 or removed therefrom. An off-on switch 49 (FIG. 1) is mounted on the top of the lower front panel 18.

As best seen in FIG. 2 and in the aforesaid copending application, the record 48 is in the form of a hollow cylinder and has a plurality of separate recording bands extending about its cylindrical surface. While the record 48 is illustrated as a cylindrical drum, it need not be cylindrical in shape but could be in the form of any number of surfaces of revolution.

The record 48 is rotatably received within the housing 10 by means of stub shafts 50 on the ends 52 of the drum snapped into spring clips 54 mounted on the inside of the end panels 12 of the housing 10 to provide for ready removal and replacement of the record drums 48. An output shaft 62 of an electrical motor 64 has an elastic band 66 wrapped thereabout and about the record drum, at a point not to interfere with the recording bands thereon to impart rotation to the drum in response to rotation of the motor output shaft 62. The motor is secured by screws 70 to the ends of bosses 72 protruding inwardly from one of the end panels 12.

A speaker 80 is secured to the inside of the lower front panel 18, behind the grate 20, in any suitable manner.

With reference to FIGS. 2 through 7, the stylus and indexing means therefore will now be described. In particular, there is provided a stylus 86 which may form part of a phonograph cartridge 88 which is mounted on one end of an elongated tone arm 90. At the end of the tone arm 90 opposite the stylus 86 there is provided a pivot including a pin 94 which is surrounded by a spring 93. The pin 94 has a retaining head 96 and is received in the lower end of an elongated indexing arm 98. As a result of the foregoing connection, the tone arm 90 may pivot on the indexing arm 98.

The indexing arm 98 terminates at a lower end 100 which is slidably received in an elongated channel 102 mounted on top of a raised, forwardly extending portion 103 of the battery housing 36. As a result, the indexing arm 98 can move in a direction parallel to the axis of rotation of the record 48. The channel 102 is wider than the lower end 100 of the indexing arm to provide for limited free movement of the indexing arm, as described hereinafter, transversely of the movement of the indexing arm along the record generally perpendicular to the axis of the record. As shown hereinafter, the indexing arm thus carries the tone arm bodily with the indexing arm to move the stylus away from the record. An elongated pivot rod 110 is mounted within the housing 12 parallel to the longitudinal axis of the record. The indexing arm and actuator 24 are pivotally and slidably mounted on the pivot rod 11.

The indexing arm 98 is formed as a U-shaped channel and intermediate its ends, in the web portion, there is provided an elongated opening 104 through which a tone arm engaging element 106 may extend. The tone arm engaging element 106 is integrally formed at the lower end of a bell crank 108 pivotally secured at 110 to the upper end of the indexing arm 98 and ultimately connected to the handle 24.

Interposed between the legs of the indexing arm 98 and in front of the bell crank 108 is a leaf spring 112 secured to the front of the bell crank by means of a screw 114 (FIG. 4). The leaf spring 112 is configured to normally urge the bell crank 108 in a counterclockwise direction about the pivot 110 as viewed in any one of the figures.

The indexing arm 98 is completed by a bridge 116 extending leftwardly from the web as viewed in FIG. 2. The bridge 116 includes an elongated opening 118 which receives the tone arm 90.

The bell crank 108 further includes a forwardly projecting lug 124 which cooperates with the notches 26 in the cover 16 to provide a detent for the manual operator.

The electronics of the sound reproduction system, as well as any other necessary details, of the structure of the aforementioned pending application is incorporated herein by reference. As applied, the batteries 38 are connected in series with the on-off switch 49 which distributes power to the remainder of the operating components. The motor 64 for driving the record will be energized whenever the switch 49 is closed.

When the switch 49 is closed, the motor 64 will be energized to rotate the record. Assuming that the stylus is in contact with a recording band on the same, the cartridge 88 will sense the mechanical vibrations, and in a conventional manner, convert the same to electrical signals to be amplified by an amplifier to drive the speaker 80. Volume control is achieved simply by adjusting a volume control potentiometer to control the maximum current flow in the circuit including the speaker 80.

The operation of the indexing system is as follows. Normally, the indexing mechanism will be in the relative positions illustrated in FIGS. 2 and 3, with the stylus 86 in contact with the record and with the lower end 100 of the indexing arm positioned intermediate upright legs **102*a* and 102*b* of the elongated channel 102. The spring 112 is positioned on the front outside of channel 102. With such an arrangement the indexing and tone arms remain spaced from the surfaces of the channel 102 and allow for a constant uniform stylus pressure as a result of gravity. The tone arm and indexing arm assembly are free to move about pin 110 as the stylus may dictate. When it is desired to change to a different band on the record, the handle 24 is depressed in the direction of arrow A (FIG. 3). This downward force in the direction of arrow A causes the entire indexing mechanism, including the indexing arm 98, tone arm 90 and bell crank 108 to pivot bodily in a clockwise direction about pivot 110 to the position shown in FIG. 4 with the lower end 100 of the indexing arm 98 in abutment with the rear upstanding wall 102*b* of the channel 102. Thus, it can be seen that the channel 100 defines limit positions for the indexing mechanisms in a direction generally transverse to the direction of movement of the indexing arm along the record 48. It can be seen in FIG. 4 that in the position shown the stylus 86 has been moved out of contact with the record and the projection 124 has been moved slightly out of the detents formed by slots or grooves 26. In this position, the entire indexing mechanism may be moved longitudinally of the record as guided by the pivot rod 110 and the guide channel 102 until a desired new band is selected. As with the structure shown in the aforementioned patent application, continued movement of the handle 24 downwardly in the direction of arrow B results in the bell crank 108 pivoting further in a clockwise direction. The tone arm engaging element 106, as best seen in FIG. 6, is biased against the tone arm 90 intermediate the pivot defined by pin 94 and the bridge 116. As a result, the tone arm 90 will pivot in a clockwise direction about a pivot defined by its point of engagement with the bridge 116 to move the stylus 86 further away from the record 48. However, because of the considerable angle of the front edge 106*a* of the arm engaging element 106 (as seen in FIG. 6), the force of the bell crank in the direction of arrow C (FIG. 6) has a considerable resulting force vector in the direction of arrow D (FIG. 6) to move the tone arm longitudinally of the record within the elongated slot in the bridge 116 to insure that the stylus 86 will return to the record 48** at the start of a new band.

Simultaneously with the release of the handle 24, the biasing of the spring 93 against the lower end of the tone arm 90 will cause the same to pivot in a counterclockwise direction about its point of engagement with the bridge 116, while at the same time the entire indexing mechanism (including the indexing arm 98, tone arm 90 and bell crank 108) will return bodily under the force of spring 112 and gravity from the position shown in FIG. 4 back to the position shown in FIGS. 2 and 3, whereupon the stylus 86 will be moved back into contact with the record 48. As pointed out above, when the handle 24 is released, the tone arm 90 will be in a predetermined position within the slot 118 in the bridge 116, which position will correspond to the start of a given band on the record to insure that the replay of the band selected will be initiated at the beginning of the band. Thd detents 26 and the angled tone arm edge **106*a*** permit the stylus to engage the record only at the beginning of the selected band on the record.

The foregoing detailed description has been given for clearness of understanding only and no unnecessary limitations should be understood therefrom as some modifications will be obvious to those skilled in the art.

We claim:

1. A phonograph device comprising a housing, an elongated cylindrical record rotatably mounted in said housing, a tone arm supported in said housing and including a stylus at one end thereof in position for operative engagement with said cylindrical record, an indexing means for said tone arm and stylus including an indexing arm mounted at one end for sliding movement along a path adjacent the side of said record, said indexing arm including a pivot connection at its other end with the other end of said tone arm affording pivoting movement of the tone arm generally lengthwise of the record, said indexing arm being mounted so that said other end thereof is freely movable about said one end in a direction generally transverse to the cylindrical axis of said record, means extending along the record in the direction of movement of the indexing arm along the record defining limit positions for said transverse movement of the indexing arm for carrying said tone arm bodily therewith to move the stylus out of contact with the record, a manual actuator pivotally connected with the indexing arm at the end thereof opposite the tone arm pivot and including a handle extending through a slot formed lengthwise of said housing, a plurality of spaced-apart detents formed along the edge of said slot in said housing, and a rib on said manual actuator in position to enter any selected one of said detents, said stylus being moved into engagement with said record when said rib is positioned in engagement with one of said detents.

2. A phonograph device as set forth in claim 1 wherein said indexing arm and said tone arm are movable bodily together between said positions by grasping and manipulating the handle of said manual operator.

3. A phonograph device as set forth in claim 1 including stabilizing spring means disposed between said manual operator and said means defining said limit positions.

4. An apparatus for indexing a stylus relative to any of a plurality of recording bands on a record, comprising:

an elongated tone arm mounting a stylus at one end thereof;

an indexing arm movably mounted at one end and including means for receiving the tone arm for limited movement relative thereto;

said indexing arm being mounted so that the end thereof opposite said one end is freely movable about said one end in a direction generally transverse to the cylindrical axis of said record;

means extending along the record in the direction of movement of the indexing arm along the record defining limit positions for said transverse movement of the indexing arm and for carrying said tone arm bodily therewith to move the stylus out of contact with the record;

means defining a connection between said tone arm and said indexing arm whereby said tone arm may pivot relative to said indexing arm;

a manual operator connected to said indexing arm including a handle adapted to be gripped by an operator to move said indexing arm to a desired position relative to a record; and means defining a tone arm engaging element operative when said handle is moved by an operator to pivot said tone arm about said pivot to a position whereby the stylus will enter the beginning of a recording band on a record when said handle is released.

5. A phonograph device as set forth in claim 4 wherein said indexing arm and said tone arm are movable bodily together between said positions by grasping and manipulating the handle of said manual operator.

6. A phonograph device as set forth in claim 4 including stabilizing spring means disposed between said manual operator and said means defining said limit positions.

7. A phonograph device comprising a housing, an elongated cylindrical record rotatably mounted in said housing, a tone arm supported in said housing and including a stylus at one end thereof in position for operative engagement with said cylindrical record, an indexing means for said tone arm and stylus including an indexing arm mounted at one end for sliding movement along a path adjacent the side of said record, said indexing arm including a pivot connection at its other end with the other end of said tone arm affording pivoting movement of the tone arm generally lengthwise of the record, said indexing arm being mounted so that said other end thereof is freely movable about said one end in a direction generally transverse to the cylindrical axis of said record from a first position to a second position for carrying said tone arm bodily therewith to move the stylus out of contact with the record, a guide channel extending along the record in the direction of movement of the indexing arm along the record and loosely receiving said other end of the indexing arm, the channel being sufficiently wider than said other end of the indexing arm to accommodate said transverse movement of the arm, with the sides of the channel defining at least one of said positions, and a manual actuator pivotally connected with the indexing arm at the end thereof opposite the tone arm pivot and including a handle movable lengthwise of said housing.

8. A phonograph device as set forth in claim 7 wherein leg portions of said guide channel define said position 2.

9. A phonograph device as set forth in claim 7 wherein said handle extends through a slot formed lengthwise of said housing, and including a plurality of spaced apart detents formed along the edge of said slot in said housing, and a rib on said manual actuator in position to enter any selected one of said detents, said stylus being moved into engagement with said record when said rib is positioned in engagement with one of said detents.

10. A phonograph device as set forth in claim 7 including stabilizing spring means disposed between said manual actuator and said channel.

11. An apparatus for indexing a stylus relative to any of a plurality of recording bands on a record, comprising:

an elongated tone arm mounting a stylus at one end thereof;

an indexing arm movably mounted at one end and including means for receiving the tone arm for limited movement relative thereto;

said indexing arm being mounted so that the end thereof opposite said one end is freely movable about said one end in a direction generally transverse to the cylindrical axis of said record from a first position to a second position for carrying said tone arm bodily therewith to move the stylus out of contact with the record;

a guide channel extending along the record in the direction of movement of the indexing arm along the record and loosely receiving said opposite end of the indexing arm, the channel being sufficiently wider than said opposite end of the indexing arm to accommodate said transverse movement of the arm, with the sides of the channel defining at least one of said positions;

means defining a connection between said tone arm and said indexing arm whereby said tone arm may pivot relative to said indexing arm; and a manual operator connected to said indexing arm including a handle adapted to be gripped by an operator to move said indexing arm to a desired position relative to a record.

12. A phonograph device as set forth in claim 11 wherein leg portion of said guide channel define said position.

13. A phonograph device as set forth in claim 11 including means defining a tone arm engaging element operative when said handle is moved by an operator to pivot said tone arm about said pivot to a position whereby the stylus will enter the beginning of a recording band on a record when said handle is released.

14. A phonograph device as set forth in claim 11 including stabilizing spring means disposed between said manual operator and said channel.

* * * * *